United States Patent Office 2,865,947
Patented Dec. 23, 1958

2,865,947

PREPARATION OF NEUTRAL PYROPHOSPHATE AND PHOSPHATE ESTERS

Kent C. Brannock and Richard L. McConnell, Kingsport, Tenn., assignors to Eastman Kodak Company, Rochester, N. Y., a corporation of New Jersey No Drawing. Application August 30, 1956
Serial No. 606,996

8 Claims. (Cl. 260—461)

This invention relates to a new process for the production of valuable organophosphorus compounds. In one of its aspects it is concerned with the preparation of neutral pyrophosphates and phosphate esters.

The value and utility of pyrophosphates and phosphate esters are well known. Certain of them have already found commercial employment as insecticides, notably the tetraalkylpyrophosphates. The trialkylphosphates are known to be useful as flame-proofing plasticizers for cellulose esters. Consequently, with these known uses and the many projected means of employment of these types of compounds, it is extremely valuable to have a means for the production of same that is commercially advantageous both in its practice and in the materials employed. Accordingly, among the objects of this invention is to provide a new and valuable chemical synthesis, to provide a new and useful means for producing neutral pyrophosphates and phosphate esters, to provide a new and useful method of production of compounds which may be used as insecticides and flame-proofing plasticizers. These and other objects will be apparent from the description and claims that follow.

We have found that a dialkyl sulfite may be reacted with a compound selected from the group consisting of phosphorus pentoxide and alkyl metaphosphates to produce neutral pyorphosphates and phosphate esters. The following equations are illustrative of the invention:

(1) $P_2O_5 + 2(RO)_2SO \rightarrow (RO)_2P(O)OP(O)(OR)_2 + 2SO_2$ (2) $(R'OPO_2)_x + 2(RO)_2SO \rightarrow R'OP(O)(OR)_2 + (R'O)_2P(O)OR + 2SO_2$ (3) $(RO)_2P(O)OP(O)(OR)_2 \xrightarrow{\Delta} (RO)_3PO + (ROPO_2)_x$ where R is an alkyl group containing 2 to 8 carbon atoms, R' is a lower alkyl group, and $x$ is a small whole integer. These reactions may be carried out within a preferred temperature range of 25–200° C. The reactions may be effected using the stoichiometric quantities as shown by Equations 1 and 2 above, or if preferred, an excess of the dialkyl sulfite may be used. If desired, solvents may be employed to carry out the reaction; inert solvents are suitable and include normally liquid hydrocarbons such as heptane, toluene, benzene and pentane, and chlorinated hydrocarbons and ethers. Also, excess dialkyl sulfite may be used as solvent, if preferred. Suitable reaction periods will vary from about 1 to 8 hours.

Among the aspects of this invention which make it particularly advantageous are the ready availability of the reactants employed. For example, methyl and ethyl metaphosphates may easily be prepared from the reaction of phosphorus pentoxide with dimethyl or diethyl ether. In addition, it is to be noted, inasmuch as the reactions involved are carried out at atmospheric pressure, and do not necessitate the use of corrosion resistant vessels such as are required in the processes for preparing phosphate esters from chlorine-containing intermediates, that the process may be carried out under commercially advantageous conditions.

A further advantage found in one aspect of this invention is that it provides a source of neutral phosphates from a process which derives the fullest utilization from the reactants involved in that it offers optimum yields from the quantity of materials employed. This aspect may be accomplished by utilizing starting materials of a dialkyl sulfite and $P_2O_5$, heating same under reflux along with a solvent, if such is desired, and after heating, distilling off the solvent and then removing the excess sulfite by distillation under reduced pressure. The residue, composed mainly of the neutral pyrophosphate, is heated to effect thermal decomposition producing a mixture of the trialkyl phosphate and the metaphosphate; this mixture is distilled under vacuum to remove the trialkyl phosphate, during which any unreacted sulfite also will be removed, re-introducing the dialkyl sulfite, previously removed, to the residue. This mixture then is heated under reflux to produce a product of neutral phosphates. Any solvent that may be present can be distilled off. Thus, optimum yields of the trialkyl phosphates are obtained using only the initial reactants employed at the beginning of the process.

The following examples will further illustrate and describe the invention.

*Example 1.—Tetraethyl pyrophosphate*

Phosphorus pentoxide (8.5 g., 0.06 mole), diethyl sulfite (60 g. 0.435 mole) and toluene (150 ml.) were combined and heated with stirring. The mixture was refluxed for 2 hours at 107 to 111° C. during which time 7.5 g. of sulfur dioxide was evolved. Distillation of the reaction mixture under reduced pressure gave, after recovery of toluene, 41 g. of recovered diethyl sulfite. After heating the residue to 105° C. at 2 mm. pressure, there remained 16 g. of an amber colored liquid which was found by analysis to contain 39.3% of tetraethyl pyrophosphate.

*Example 2.—Triethyl phosphate*

Phosphorus pentoxide (14.2 g., 0.1 mole), diethyl sulfite (55.2 g., 0.4 mole) and 50 ml. of chloroform were combined and heated under reflux for 3.5 hours after which time the phosphorus pentoxide had dissolved, and 12 g. of sulfur dioxide had been evolved. The chloroform was then removed by distillation at atmospheric pressure, heating the residue to 165° C. Distillation was continued in vacuo, giving 24.5 g. of recovered diethyl sulfite, boiling point 36–39° C. at 5–6 mm., and 15.1 g. of triethyl phosphate, boiling point 80–84° C. at 5–6 mm., $n_D^{20}$ 1.4058, and 15.0 g. of residue. Most of the triethyl phosphate was obtained while the pot temperature was in the 130–160° C. range.

Based on the reactions below the conversion to triethyl phosphate was 83% of the theoretical.

(1) $P_2O_5 + 2(C_2H_5O)_2SO \rightarrow 2SO_2 + (C_2H_5O)_2P(O)OP(O)(OC_2H_5)_2$ (2) $(C_2H_5O)_2P(O)OP(O)(OC_2H_5)_2 \xrightarrow{\Delta} (C_2H_5O)_3PO + (C_2H_5OPO_2)_x$

*Example 3.—Mixed butyl ethyl phosphates*

Ethyl metaphosphate (10.8 g., 0.1 mole), dibutyl sulfite (38.8 g., 0.2 mole) and toluene (100 ml.) were placed in a flask and heated at reflux with stirring for 3 hours. All of the ethyl metaphosphate had dissolved by this time and 12.3 g. of $SO_2$ had been evolved. After distilling the toluene, the reaction mixture was purified by distillation at reduced pressures. The mixture of neutral phosphates (12.6 g.) boiled over the range of 86°

C. at 3.4 mm. to 136° C. at 4.2 mm. This mixture could be separated into triethyl phosphate, butyl diethyl phosphate, dibutyl ethyl phosphate, and tributyl phosphate by a careful fractional distillation. This fractionation is unnecessary, however, since this mixture of phosphates is an excellent flameproofing plasticizer for cellulose esters.

Example 4.—Mixed ethyl propyl phosphates

Ethyl metaphosphate (10.8 g., 0.1 mole), dipropyl sulfite (33.2 g., 0.2 mole), and xylene (100 ml.) were reacted according to the procedure of Example 3. The mixture of ethyl propyl phosphates distilled over the range 82–99° C. at 3.0 mm.

Example 5.—Mixed ethyl 2-ethylhexyl phosphates

A mixture of ethyl metaphosphate (10.8 g., 0.1 mole) and bis(2-ethylhexyl) sulfite (61.2 g., 0.2 mole) was reacted according to the procedure of Example 3. The boiling range for the mixed ethyl 2-ethylhexyl phosphates was 114–180° C. at 2.4 mm.

Example 6

A mixture of methyl metaphosphate (18.8 g., 0.2 mole) and dibutyl sulfite (77.6 g., 0.4 mole) was reacted according to the procedure of Example 3. The boiling range for the mixed butyl methyl phosphates was 76–115° C. at 2.8 mm.

Thus, the foregoing illustrates to one skilled in the art that our invention introduces new and valuable means by which many useful compounds may be produced, both as specifically illustrated in the particular embodiments shown above, and in those others which are within the scope and spirit of the invention as described hereinabove and as defined in the appended claims.

We claim:

1. The process which comprises reacting within a temperature range of 25° to 200° C. a dialkyl sulfite wherein the alkyl radicals contain from 2–8 carbon atoms with a compound selected from the group consisting of phosphorus pentoxide and a lower alkyl metaphosphate, to produce a compound selected from the group consisting of neutral pyrophosphates and phosphate esters.

2. The process which comprises reacting within a temperature range of 25° to 200° C. a dialkyl sulfite wherein the alkyl radicals contain from 2–8 carbon atoms with phosphorus pentoxide to produce a tetraalkyl pyrophosphate.

3. The process which comprises reacting within a temperature range of 25° to 200° C. an excess of dialkyl sulfite wherein the alkyl radicals contain from 2–8 carbon atoms with phosphorus pentoxide to produce a tetraalkyl pyrophosphate, removing excess dialkyl sulfite, thermally decomposing said tetraalkyl pyrophosphate to produce the corresponding trialkyl phosphate and alkyl metaphosphate, recovering said trialkyl phosphate, reacting said alkyl metaphosphate with said excess dialkyl sulfite at a temperature within the range of 25° to 200° C. to produce additional trialkyl phosphate.

4. The process which comprises heating phosphorus pentoxide with diethyl sulfite under reflux, at a temperature within the 25° to 200° C. range, so as to produce tetraethyl pyrophosphate.

5. The process which comprises reacting within a temperature range of 25–200° C. a dialkyl sulfite wherein the alkyl radicals contain from 2–8 carbon atoms with a lower-alkyl metaphosphate to produce corresponding phosphate esters.

6. The process which comprises heating ethyl metaphosphate with dibutyl sulfite under reflux within the 25° to 200° C. temperature range so as to produce triethyl phosphate, butyl diethyl phosphate, dibutyl ethyl phosphate, and tributyl phosphate.

7. The process which comprises heating ethyl metaphosphate with dipropyl sulfite under reflux within the 25° to 200° C. temperature range so as to produce triethyl phosphate, propyl diethyl phosphate, dipropyl ethyl phosphate, and tripropyl phosphate.

8. The process which comprises heating ethyl metaphosphate with bis(2-ethylhexyl) sulfite under reflux within the 25° to 200° C. temperature range so as to produce triethyl phosphate, di-2-ethylhexyl ethyl phosphate, diethyl 2-ethylhexyl phosphate, and tri-2-ethylhexyl phosphate.

References Cited in the file of this patent

Kosolapoff: Organo Phosphorus Compounds (1950 edition), pages 340 and 341 (John Wiley & Sons, Inc., New York, N. Y.).